US008036383B2

(12) United States Patent
Kim et al.

(10) Patent No.: US 8,036,383 B2
(45) Date of Patent: Oct. 11, 2011

(54) METHOD AND APPARATUS FOR SECURE COMMUNICATION BETWEEN CRYPTOGRAPHIC SYSTEMS USING REAL TIME CLOCK

(75) Inventors: Jae Heon Kim, Daejeon (KR); Jae Woo Han, Daejeon (KR); Dong Chan Kim, Daejeon (KR); Sang Woo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 828 days.

(21) Appl. No.: 12/103,130

(22) Filed: Apr. 15, 2008

(65) Prior Publication Data
US 2009/0138743 A1    May 28, 2009

(30) Foreign Application Priority Data

Nov. 22, 2007    (KR) .................. 10-2007-0119681

(51) Int. Cl.
*H04K 1/00* (2006.01)
(52) U.S. Cl. .................. 380/255; 380/35; 380/264
(58) Field of Classification Search .............. 380/255, 380/264, 35, 277, 281, 282, 224, 44, 45; 713/171
See application file for complete search history.

(56) References Cited

U.S. PATENT DOCUMENTS

| 4,924,515 | A | * | 5/1990 | Matyas et al. ............... 380/280 |
| 5,265,164 | A | * | 11/1993 | Matyas et al. ............... 380/30 |
| 5,343,527 | A | * | 8/1994 | Moore ........................... 713/179 |
| 5,533,123 | A | * | 7/1996 | Force et al. ................... 713/189 |
| 5,745,572 | A | * | 4/1998 | Press ............................. 380/280 |
| 7,024,561 | B2 | | 4/2006 | Inoha et al. |
| 2002/0087860 | A1 | | 7/2002 | Kravitz |
| 2007/0101152 | A1 | | 5/2007 | Mercredi et al. |

FOREIGN PATENT DOCUMENTS

| EP | 0 656 708 A1 | 6/1995 |
| JP | 61296835 A | 12/1986 |
| JP | 2005274275 A | 10/2005 |
| KR | 1020010002738 | 1/2001 |
| KR | 1020020025343 A | 4/2002 |
| KR | 1020030076457 A | 9/2003 |
| KR | 1020040085113 A | 10/2004 |

\* cited by examiner

*Primary Examiner* — Krisna Lim
(74) *Attorney, Agent, or Firm* — Ladas & Parry LLP

(57) ABSTRACT

Provided are a method and apparatus for secure communication between cryptographic systems using a Real Time Clock (RTC). The method and apparatus allow a transmitting cryptographic system to transfer partial RTC data and a receiving cryptographic system to restore entire RTC data, thereby minimizing data to be transferred between the cryptographic systems. The method includes: calculating a largest RTC deviation between a transmitting cryptographic system and a receiving cryptographic system; calculating the smallest number of bits of partial data on an RTC required for restoring entire data on the RTC on the basis of the calculated largest RTC deviation; calculating the partial RTC data on the basis of the calculated smallest number of bits of the partial RTC data; and transferring the calculated partial RTC data to the receiving cryptographic system.

12 Claims, 4 Drawing Sheets

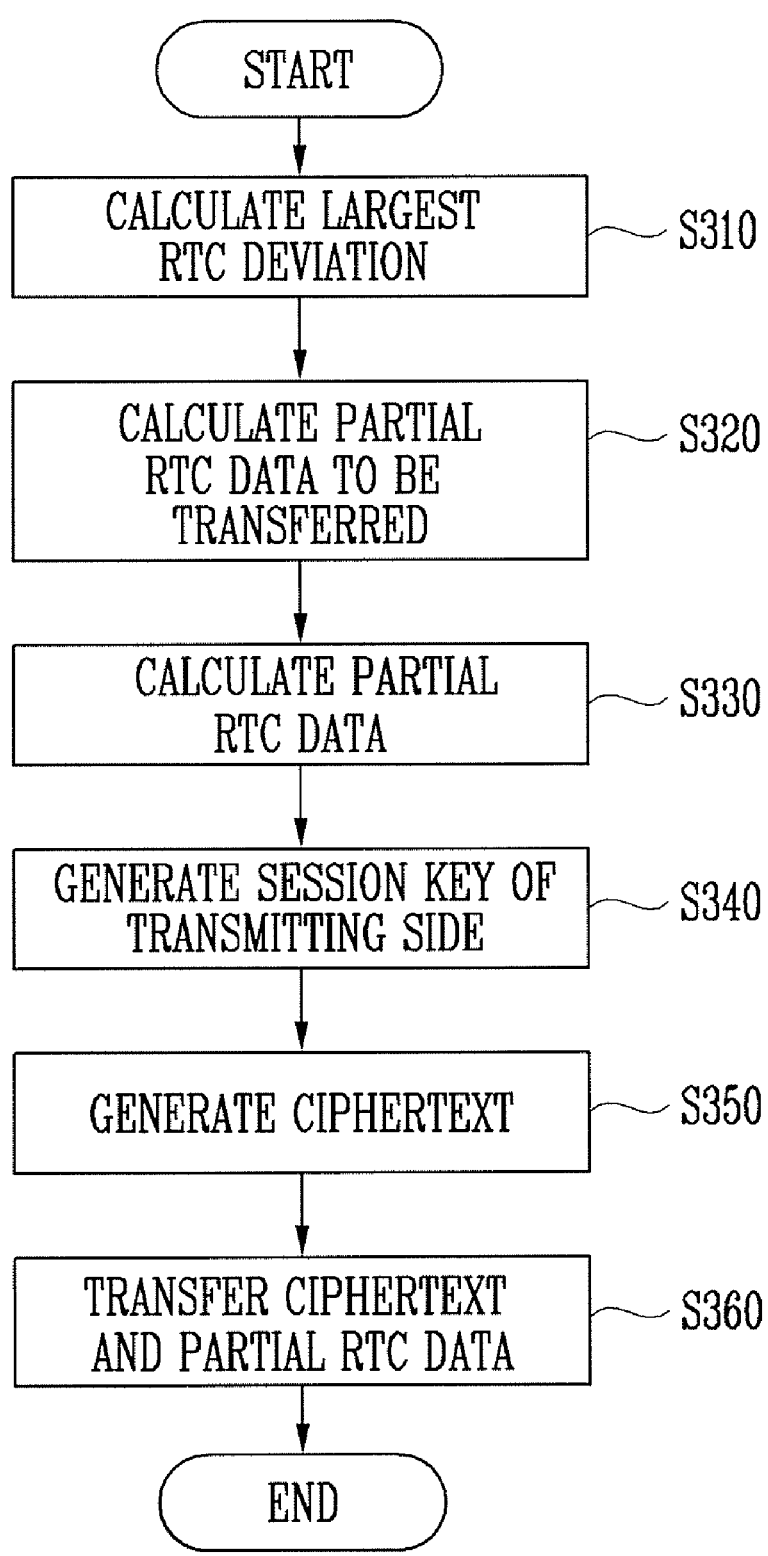

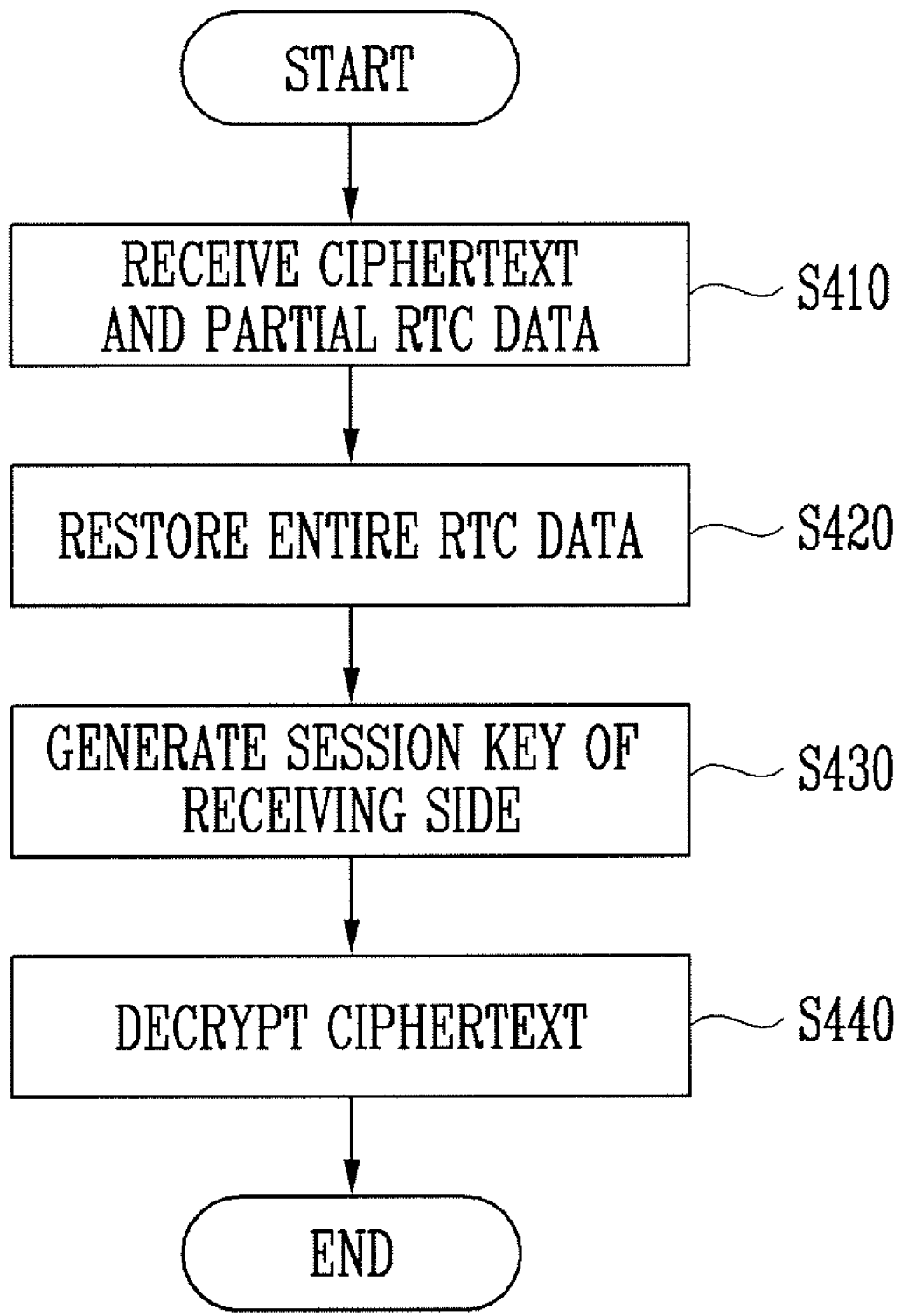

METHOD AND APPARATUS FOR SECURE COMMUNICATION BETWEEN CRYPTOGRAPHIC SYSTEMS USING REAL TIME CLOCK

CROSS-REFERENCE TO RELATED APPLICATION

This application claims priority to and the benefit of Korean Patent Application No. 2007-119681, filed Nov. 22, 2007, the disclosure of which is incorporated herein by reference in its entirety.

BACKGROUND

1. Field of the Invention

The present invention relates to a method and apparatus for secure communication between cryptographic systems using a Real Time Clock (RTC), and more particularly, to a method and apparatus for secure communication between cryptographic systems allowing a transmitting cryptographic system to transfer partial RTC data and a receiving cryptographic system to restore entire RTC data and thereby minimizing data to be transferred between the cryptographic systems.

2. Discussion of Related Art

As network communication has become a major means for exchanging information, the necessity of securing important information, e.g., private information and a secret code, exchanged in a network has increased. However, networks are vulnerable to cyber attacks, and thus it is necessary to safely transfer important information exchanged in a network using a cryptosystem shared by both sides of communication.

There are typical cryptosystems such as a secret-key cryptosystem and a public-key cryptosystem.

According to the public-key cryptosystem, a key used for encrypting data is different from a key used for decrypting the data. In general, the key used for encryption is referred to as a public key, and the key used for decrypting a ciphertext encrypted using the public key is referred to as a private key. The private key is secured so that a user alone knows it, but the public key is published so that anyone can obtain it. A ciphertext encrypted using a public key can be decrypted using only a private key that makes a pair with the public key.

On the other hand, according to the secret-key cryptosystem, two users performing cryptographic communication share a secret key and perform encryption and decryption using the secret key. Therefore, the same key is used for encrypting and decrypting data.

In the secret-key cryptosystem, a master key is a secret key shared by two users performing secure communication. Here, when encryption and decryption is performed using only one master key, the same ciphertexts are generated from one plaintext. When the same ciphertext are generated, an outsider can find out the secret key. To prevent this, data of a number or bit string used only once, referred to as a "nonce", is used whenever cryptographic communication is performed. Every time cryptographic communication is performed, a new encryption key or decryption key is generated using a master key and a nonce. Here, the generated key is referred to as a session key.

Two users performing secure communication insert a master key and a nonce into a Key Derivation Function (KDF) and use the output value as a session key. By constantly generating and using a new session key, it is possible to generate various ciphertexts from one plaintext.

FIG. 1 is a flowchart showing a method for cryptographic communication of a conventional secret-key-based cryptographic system.

Referring to FIG. 1, users A and B performing cryptographic communication share a master key K, and the user A generates a nonce N (step 110). Subsequently, the user A calculates KDF(K, N) using the master key K and the nonce N to generate a session key (step 120). In the next step, the user A encrypts a plaintext using the generated session key to generate a ciphertext (step 130). Then, the user A transfers the nonce N and the generated ciphertext to the user B (step 140). The user B generates the session key KDF(K, N) using the received nonce N and the shared master key K (step 150). Subsequently, the user B decrypts the received ciphertext using the session key (step 160).

To share the same session key, two cryptographic systems need to share the same nonce. To this end, in general, one cryptographic system generates a nonce and transfers it to the other cryptographic system. Here, it is necessary to minimize the size of the transferred nonce in a poor communication environment. However, when the size of a nonce is reduced, a probability of the nonce being reused increases, and the same session key as the previously used session key may be generated. Therefore, a nonce must not be reused.

To prevent a nonce from being reused, a continuously changed value, such as a counter, is used as a nonce. Here, an RTC is frequently used as a counter because it can serve as a common value that can be shared by all systems. However, due to RTC deviation among systems, it is very difficult for all the systems to share the same RTC data.

SUMMARY OF THE INVENTION

The present invention is directed to a method and apparatus allowing a transmitting cryptographic system to generate a nonce value $N=f(T_A, \text{other data})$ (f is a function) using entire Real Time Counter (RTC) data $T_A$ and transfer $N^T=(P_A \| \text{other data})$ obtained using partial RTC data $P_A$ to a receiving cryptographic system and the receiving cryptographic system to restore the entire RTC data $T_A$ and the correct nonce value N from the received partial RTC data $P_A$, and thereby minimizing data to be transferred between the cryptographic systems.

One aspect of the present invention provides a method for secure communication between cryptographic systems using an RTC, the method comprising: calculating a largest RTC deviation between a transmitting cryptographic system and a receiving cryptographic system; calculating the smallest number of bits of partial data on an RTC required for restoring entire data on the RTC on the basis of the calculated largest RTC deviation; calculating the partial RTC data on the basis of the calculated smallest number of bits of the partial RTC data; and transferring the calculated partial RTC data to the receiving cryptographic system.

The method may further comprise restoring, at the receiving cryptographic system, the entire RTC data on the basis of the received partial RTC data.

The largest RTC deviation may be calculated according to lives of the transmitting and receiving cryptographic systems and an accuracy of the RTC.

The smallest number "n" of bits of the partial RTC data may be calculated by the following equation: $n = \lceil \log_2 T_d \rceil 1$ denotes a largest RTC deviation between a transmitting cryptographic system and a receiving cryptographic system).

The partial RTC data may be calculated by the following equation: $T_A \bmod 2^n$ ($T_A$ denotes an RTC value of a transmitting cryptographic system, and n denotes the smallest number of bits of partial RTC data).

The entire RTC data X may render $|X-T_B|$ ($T_B$ denotes an RTC value of a receiving cryptographic system) to be a smallest value and may be calculated by the following equation: $X = T_A \mod 2^n + k\, 2^n$ (k is an integer).

Another aspect of the present invention provides an apparatus for secure communication between cryptographic systems using an RTC, the apparatus comprising: a largest RTC deviation calculator for calculating a largest RTC deviation between a transmitting cryptographic system and a receiving cryptographic system; a partial RTC data calculator for calculating the smallest number of bits of partial data on an RTC required for restoring entire data on the RTC on the basis of the calculated largest RTC deviation; a partial RTC data extractor for calculating the partial RTC data on the basis of the calculated smallest number of bits of the partial RTC data; and a partial RTC data transmitter for transferring the calculated partial RTC data to the receiving cryptographic system.

The apparatus may further comprise: a partial RTC data receiver for receiving transferred partial RTC data; and an entire RTC data restorer for restoring entire RTC data on the basis of the received partial RTC data.

The largest RTC deviation calculator may calculate the largest RTC deviation according to lives of the transmitting and receiving cryptographic systems and an accuracy of the RTC.

The partial RTC data calculator may calculate the smallest number "n" of bits of the partial RTC data using the following equation: $N = \lceil \log_2 T_d \rceil + 1$ ($T_d$ denotes a largest RTC deviation between a transmitting cryptographic system and a receiving cryptographic system).

The partial RTC data extractor may calculate the partial RTC data using the following equation: $T_A \mod 2^n$ ($T_A$ denotes an RTC value of a transmitting cryptographic system, and n denotes the smallest number of bits of partial RTC data).

The entire RTC data restorer may calculate the entire RTC data X rendering $|X - T_B|$ ($T_B$ denotes an RTC value of a receiving cryptographic system) to be a smallest value using the following equation: $X = T_A \mod 2^n + k\, 2^n$ (k is an integer).

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 3 is a flowchart showing a method of transmitting a ciphertext using an RTC according to an exemplary embodiment of the present invention; and FIG. 4 is a flowchart showing a method of receiving a ciphertext using an RTC according to an exemplary embodiment of the present invention.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
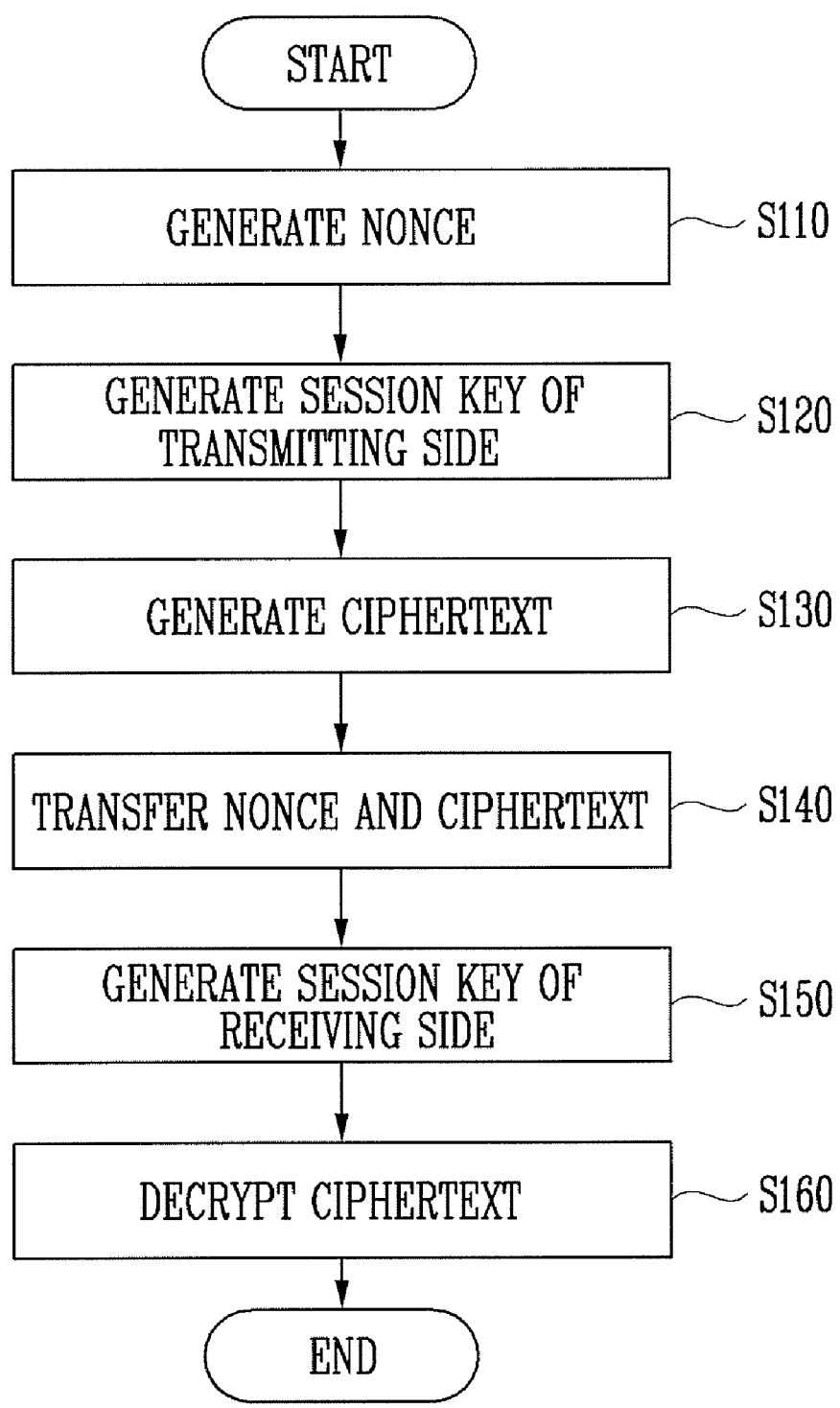
FIG. 1 is a flowchart showing a method for cryptographic communication of a conventional secret-key cryptographic system.
Figure 2:
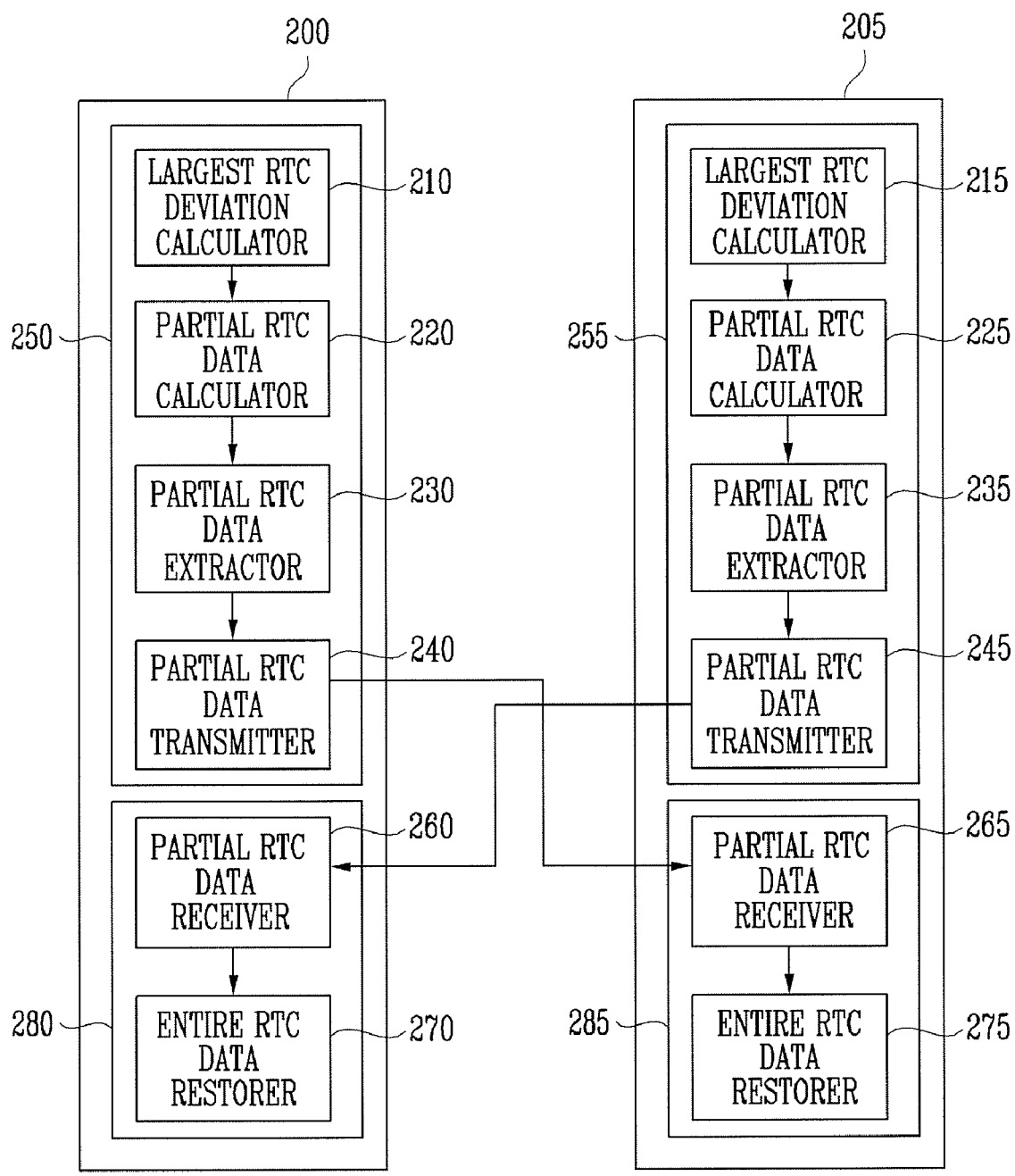
FIG. 2 is a block diagram of an apparatus for secure communication between cryptographic systems using a Real Time Clock (RTC) according to an exemplary embodiment of the present invention.

FIG. 2 is a block diagram of an apparatus for secure communication between cryptographic systems using a Real Time Clock (RTC) according to an exemplary embodiment of the present invention.

Referring to FIG. 2, cryptographic system A 200 includes an RTC transmitter 250 and an RTC receiver 280. Similarly, cryptographic system B 205 includes an RTC transmitter 255 and an RTC receiver 285. The RTC transmitter 250 includes a largest RTC calculator 210, a partial RTC data calculator 220, a partial RTC data extractor 230 and a partial RTC data transmitter 240. Since the RTC transmitter 255 has the same elements with the RTC transmitter 250, the detailed explanation of it will be omitted. The RTC receiver 280 includes a partial RTC data receiver 260 and an entire RTC data restorer 270. The RTC receiver 285 has the same elements with the RTC receiver 280.

Since cryptographic system A 200 includes the RTC transmitter 250 and the RTC receiver 280 and cryptographic system B 205 includes the RTC transmitter 255 and the RTC receiver 285, cryptographic system A 200 and cryptographic system B 205 can transfer and receive an RTC.

A case will be described below in which cryptographic system A 200 transfers a ciphertext to cryptographic system B 205.

First, the largest RTC deviation calculator 210 calculates a largest RTC deviation $T_d$ (in seconds) between cryptographic system A 200 and cryptographic system B 205. Assuming that an RTC deviation, which is a difference between a current time and an RTC value, is "a", an RTC value of cryptographic system A 200 may be (current time−a), and an RTC value of cryptographic system B 205 may be (current time+a). Thus, the largest RTC deviation may be $2a$. Here, lives of cryptographic system A 200 and cryptographic system B 205 and an accuracy of the RTC (i.e., a frequency of a crystal oscillator) should be obtained to determine the RTC deviation "a".

For example, there is a cryptographic system that has a life of thirty years, and an accuracy of an RTC used in the system is 1 ppm, i.e., a deviation of one second occurs during 1000000 seconds. Since one year is about $2^{25}$ seconds and 1000000 seconds are about $2^{20}$ seconds, a deviation occurring during one year is about $2^5$ ($=2^{25}/2^{20}$) seconds. The cryptographic system operates for thirty years, i.e., about $2^5$ years, and thus a largest RTC deviation is $2^{10}$ ($=2^5 * 2^5$)

Then, the partial RTC data calculator 220 calculates the number of bits of partial RTC data to be transferred. Here, the number "n" of bits to be transferred is as shown in Equation 1 below.

$$n = \lceil \log_2 T_d \rceil + 1 \qquad \text{Equation 1}$$

($T_d$ denotes the largest RTC deviation between cryptographic systems)

And then, the partial RTC data extractor 230 calculates $T_A \mod 2^n$ that is a remainder obtained by dividing $T_A$, which is an RTC value of cryptographic system A 200, by $2^n$.

This is application of an integer grouping method of dividing all integers into k groups. The integer grouping method is as follows:

Group[0] = a set of numbers yielding a remainder of 0 when the numbers are divided by k, representative = 0
Group[1] = a set of numbers yielding a remainder of 1 when the numbers are divided by k, representative = 1
Group[2] = a set of numbers yielding a remainder of 2 when the numbers are divided by k, representative = 2

Group[k−1]=a set of numbers yielding a remainder of (k−1) when the numbers are divided by k, representative=(k−1).

Through the calculation, the partial RTC data extractor 230 finds out a representative of a group to which the entire RTC data $T_A$ belongs, and determines the representative as partial RTC data $P_A$. Cryptographic system A 200 generates a session key using the entire RTC data $T_A$ as a nonce and then generates a ciphertext.

After this, when cryptographic system A 200 transfers the ciphertext to cryptographic system B 205, the partial RTC data transmitter 240 transfers the calculated value $T_A$ mod $2^n$, i.e., the representative value of the group to which the RTC value of cryptographic system A 200 belongs, to the partial RTC data receiver 265 of cryptographic system B 205.

The entire RTC data restorer 275 of cryptographic system B 205 finds out the RTC value of cryptographic system A 200 using the representative value of the group, to which the RTC value of cryptographic system A 200 belongs, received by the partial RTC data receiver 265. More specifically, the entire RTC data restorer 275 calculates candidate values that can be the RTC value of cryptographic system A 200 using the RTC representative value, and determines as the RTC value a value having a smallest difference from an RTC value of cryptographic system B 205 among the candidate values.

To this end, X minimizing is first calculated. Here, $T_B$ is the RTC value of cryptographic system B 205, and X is as shown in Equation 2 below.

$$X = T_A \bmod 2^n + k2^n \qquad \text{Equation 2}$$

(k is an integer)

Through the process above, Equation 3 below is satisfied, and remainders obtained by dividing X and $T_A$ by $2^n$ are the same as each other. Consequently, X is equal to $T_A$.

$$|X-T_A| \leq |X-T_B| + |T_B-T_A| \leq 2^{n-1} + T_d < 2^n \qquad \text{Equation 3}$$

When the entire RTC data of cryptographic system A 200 is restored through the above described process, cryptographic system B 205 generates a session key of a receiving side using the entire RTC data and decrypts the ciphertext.

The above process will be described with reference to an example.

Assuming that a largest RTC deviation between cryptographic systems A and B is 30 seconds, an RTC value of cryptographic system A is 10 hours 59 minutes 45 seconds (39585 seconds), and an RTC value of cryptographic system B is 11 hours 00 minutes 03 seconds (39603 seconds), n is equal to 6, and cryptographic system A transfers "33" that is a remainder obtained by dividing 39585 by 64 ($2^6$) to cryptographic system B. Cryptographic system B calculates X satisfying X=$T_A$ mode 64=33 and minimizing |X−39603|, thereby obtaining X of 39585. Consequently, when cryptographic system A transfers partial data of its RTC value corresponding to 6 bits to cryptographic system B, cryptographic system B can restore the entire RTC value of cryptographic system A using its RTC value.

FIG. 3 is a flowchart showing a method of transmitting a ciphertext using an RTC according to an exemplary embodiment of the present invention.

First, cryptographic system A transferring a ciphertext calculates a largest RTC deviation between cryptographic system A itself and cryptographic system B receiving the ciphertext in consideration of lives of the two cryptographic systems and an accuracy of an RTC, i.e., a frequency of a crystal oscillator (step 310).

Subsequently, cryptographic system A calculates the number "n" of bits of partial RTC data to be transferred using Equation 1 above (step 320).

In the next step, cryptographic system A calculates $T_A$ mod $2^n$ that is a remainder obtained by dividing $T_A$, which is an RTC value of cryptographic system A, by $2^n$ (step 330). Cryptographic system A generates a session key using the entire RTC data $T_A$ as a nonce (step 340), and then generates a ciphertext (step 350).

Cryptographic system A transfers the calculated value $T_A$ mod $2^n$, i.e., a representative value of a group to which the RTC value of cryptographic system A belongs, together with the ciphertext to cryptographic system B (step 360). Since only the representative value instead of $T_A$, which is the RTC value of cryptographic system A, is transferred, an amount of data to be transferred can be reduced.

FIG. 4 is a flowchart showing a method of receiving a ciphertext using an RTC according to an exemplary embodiment of the present invention.

Cryptographic system B receives a ciphertext and a representative value of an RTC from cryptographic system A (step 410), and restores the RTC value of cryptographic system A using the representative value (step 420).

To this end, X minimizing |X−$T_B$| is first calculated. Here, $T_B$ is an RTC value of cryptographic system B, and X is as shown in Equation 2 above.

Through the process, Equation 3 above is satisfied, and remainders obtained by dividing X and $T_A$ by $2^n$ are the same as each other. Consequently, X is equal to $T_A$.

When the entire RTC data of cryptographic system A is restored through the above described process, cryptographic system B restores a nonce using the entire RTC data to generate a session key of a receiving side (step 430) and decrypts the ciphertext (step 440).

A case in which entire RTC data is transferred and a case in which partial RTC data is transferred according to an exemplary embodiment of the present invention will be compared with each other below.

First, a transmitting cryptographic system may transfer entire RTC data. Since an RTC value is converted into about $2^{38.2}$ seconds (9999 years*365 days*24 hours*60 minutes*60 seconds), the value corresponding to about 39 bits must be transferred. In a poor communication environment, it is difficult to transfer 39-bit data.

On the other hand, when partial RTC data is transferred according to an exemplary embodiment of the present invention, a transmitting cryptographic system transfers only about the double of a largest RTC difference between cryptographic systems instead of its entire RTC value. Thus, it is possible to remarkably reduce the amount of data to be transferred in comparison with 39 bits required for transferring the entire RTC data. For example, when largest values of RTC difference between cryptographic systems are one minute, i.e., about $2^{5.9}$ seconds, one hour, i.e., about $2^{11.8}$ seconds, and one day, i.e., about $2^{16.4}$ seconds, a transmitting cryptographic system transfers only 7 bits, 13 bits and 18 bits, respectively.

According to the present invention, entire RTC data of a cryptographic system is used as a nonce value required for generating a session key between the cryptographic system and another cryptographic system, and an amount of RTC data to be transferred is minimized, so that the cryptographic systems can operate in a poor communication environment.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for secure communication between cryptographic systems using a Real Time Counter (RTC), comprising:
    calculating a largest RTC deviation between a transmitting cryptographic system and a receiving cryptographic system;
    calculating the smallest number of bits of partial data on an RTC required for restoring entire data on the RTC on the basis of the calculated largest RTC deviation;
    calculating the partial RTC data on the basis of the calculated smallest number of bits of the partial RTC data; and
    transferring the calculated partial RTC data to the receiving cryptographic system.

2. The method of claim 1, further comprising:
    restoring, at the receiving cryptographic system, the entire RTC data on the basis of the received partial RTC data.

3. The method of claim 1, wherein the calculating of the largest RTC deviation comprises calculating the largest RTC deviation according to lives of the transmitting and receiving cryptographic systems and an accuracy of the RTC.

4. The method of claim 1, wherein the smallest number "n" of bits of the partial RTC data is calculated by the following equation:

$$n = \lceil \log_2 T_d \rceil + 1,$$

wherein $T_d$ denotes the largest RTC deviation between the transmitting cryptographic system and the receiving cryptographic system.

5. The method of claim 4, wherein the partial RTC data is calculated by the following equation:

$$T_A \bmod 2^n,$$

wherein $T_A$ denotes the RTC value of the transmitting cryptographic system, and n denotes the smallest number of bits of partial RTC data.

6. The method of claim 2, wherein the entire RTC data X renders $|X-T_B|$ be a smallest value and is calculated by the following equation:

$$X = T_A \bmod 2^n + k2^n,$$

wherein $T_B$ denotes an RTC value of the receiving cryptographic system, and k is an integer.

7. An apparatus for secure communication between cryptographic systems using a Real Time Counter (RTC), comprising:
    a largest RTC deviation calculator for calculating a largest RTC deviation between a transmitting cryptographic system and a receiving cryptographic system;
    a partial RTC data calculator for calculating the smallest number of bits of partial data on an RTC required for restoring entire data on the RTC on the basis of the calculated largest RTC deviation;
    a partial RTC data extractor for calculating the partial RTC data on the basis of the calculated smallest number of bits of the partial RTC data; and
    a partial RTC data transmitter for transferring the calculated partial RTC data to the receiving cryptographic system.

8. The apparatus of claim 7, further comprising:
    a partial RTC data receiver for receiving transferred partial RTC data; and
    an entire RTC data restorer for restoring entire RTC data on the basis of the received partial RTC data.

9. The apparatus of claim 7, wherein the largest RTC deviation calculator calculates the largest RTC deviation according to lives of the transmitting and receiving cryptographic systems and an accuracy of the RTC.

10. The apparatus of claim 7, wherein the partial RTC data calculator calculates the smallest number "n" of bits of the partial RTC data using the following equation:

$$n = \lceil \log_2 T_d \rceil + 1,$$

wherein $T_d$ denotes the largest RTC deviation between the transmitting cryptographic system and the receiving cryptographic system.

11. The apparatus of claim 10, wherein the partial RTC data extractor calculates the partial RTC data using the following equation:

$$T_A \bmod 2^n,$$

wherein $T_A$ denotes the RTC value of the transmitting cryptographic system, and n denotes the smallest number of bits of partial RTC data.

12. The apparatus of claim 8, wherein the entire RTC data restorer calculates the entire RTC data X rendering $|X-T_B|$ to be a smallest value using the following equation:

$$X = T_A \bmod 2^n + k2^n,$$

wherein $T_B$ denotes an RTC value of the receiving cryptographic system, and k is an integer.

* * * * *